(12) United States Patent
Bhattacharjee et al.

(10) Patent No.: US 12,342,227 B2
(45) Date of Patent: Jun. 24, 2025

(54) AUTOMATIC ENABLING ENDC (EVOLVED UNIVERSAL MOBILE TELECOMMUNICATIONS SYSTEM (UMTS) TERRESTRIAL RADIO ACCESS NETWORK (E-UTRAN) NEW RADIO (NR)—DUAL CONNECTIVITY FOR 4G LONG TERM EVOLUTION (LTE) EVOLVED NODE B (eNB)

(71) Applicant: Rakuten Mobile, Inc., Tokyo (JP)

(72) Inventors: Avijit Bhattacharjee, Tokyo (JP); Abhishek Kumar, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/905,414

(22) PCT Filed: Jul. 11, 2022

(86) PCT No.: PCT/US2022/036634
§ 371 (c)(1),
(2) Date: Sep. 1, 2022

(87) PCT Pub. No.: WO2024/015042
PCT Pub. Date: Jan. 18, 2024

(65) Prior Publication Data
US 2024/0205762 A1    Jun. 20, 2024

(51) Int. Cl.
*H04W 36/00* (2009.01)
*H04W 36/30* (2009.01)

(52) U.S. Cl.
CPC ... *H04W 36/0069* (2018.08); *H04W 36/0058* (2018.08); *H04W 36/304* (2023.05)

(58) Field of Classification Search
CPC ......... H04W 36/0069; H04W 36/0061; H04W 36/0064; H04W 36/0077; H04W 36/0079; H04W 36/0066; H04W 36/00692; H04W 36/0055; H04W 36/0058; H04W 36/302; H04W 36/304; H04W 36/305
See application file for complete search history.

(56) References Cited

U.S. PATENT DOCUMENTS 11,895,719 B1 * 2/2024 Polaganga ............ H04W 76/15
2020/0383155 A1 * 12/2020 Pati ....................... H04B 17/336
(Continued)

FOREIGN PATENT DOCUMENTS

| WO | WO-2020256443 A1 * | 12/2020 | ........ H04W 36/0058 |
| WO | WO-2021169998 A1 * | 9/2021 | ............. H04W 76/15 |
| WO | WO-2022264150 A1 * | 12/2022 | ........ H04W 36/0083 |

*Primary Examiner* — Phong La
(74) *Attorney, Agent, or Firm* — HAUPTMAN HAM, LLP

(57) ABSTRACT

An evolved Node B (eNB) for providing automatic ENDC enabling. Measurement reports are generated during a prior handover by user equipment (UE) configured in 5G NR connected mode. The measurement reports are received at a 4G LTE evolved Node B. Based on the measurement reports, the 4G LTE eNB determines a number of Automatic ENDC Enable (AEE) criterion being met during a predetermined time period that is greater than a threshold. In response to the number of Automatic ENDC Enable (AEE) criterion met during the predetermined time period being greater than the threshold, ENDC is automatically enabled for the 4G LTE eNB.

20 Claims, 7 Drawing Sheets

(56) References Cited

U.S. PATENT DOCUMENTS

| | | | |
|---|---|---|---|
| 2021/0007025 A1* | 1/2021 | Kumar | H04W 36/008357 |
| 2021/0368568 A1* | 11/2021 | Jangid | H04W 72/0453 |
| 2022/0416820 A1* | 12/2022 | Cho | H04B 1/1607 |
| 2023/0097617 A1* | 3/2023 | Pradhan | H04W 36/008355 |
| | | | 370/329 |
| 2023/0292257 A1* | 9/2023 | Gupta | H04W 52/0254 |
| 2024/0155328 A1* | 5/2024 | Fu | H04W 52/0216 |
| 2024/0187982 A1* | 6/2024 | Murugan | H04W 36/08 |
| 2024/0205762 A1* | 6/2024 | Bhattacharjee | H04W 36/304 |
| 2024/0312335 A1* | 9/2024 | Gupta | G08B 29/185 |

* cited by examiner

| MO Class | enbName | CellName | nrMeasObjid | SubcarrierSpacing | Periodicity | Offset | ssbDuration | OffsetFreq |
|---|---|---|---|---|---|---|---|---|
| NrMeasObject Table | ABC4XUZ253543 | Sec5 | 324464 | kHz30 | sf5 | 0 | sf2 | 1 |
| NrMeasObject Table | ABC4XUZ253543 | Sec5 | 8793789 | kHz120 | sf5 | 0 | sf2 | 1 |
| MO Class | enbName | CellName | EventIntrRatid | | | | | |
| DefaultHandoverProfile | ABC4XUZ253543 | Sec5 | 6 | | | | | |
| MO Class | enbName | CellName | EndcSupport | | | | | |
| LTEService | ABC4XUZ253543 | Sec5 | Disabled | | | | | |
| MO Class | enbName | CellName | EndcEnableState | | | | | |
| ANR | ABC4XUZ253543 | Sec5 | Enabled | | | | | |
| MO Class | enbName | CellName | EndcPlmn | | | | | |
| PLMN | ABC4XUZ253543 | Sec5 | TRU | | | | | |

FIG. 5

AUTOMATIC ENABLING ENDC (EVOLVED UNIVERSAL MOBILE TELECOMMUNICATIONS SYSTEM (UMTS) TERRESTRIAL RADIO ACCESS NETWORK (E-UTRAN) NEW RADIO (NR)—DUAL CONNECTIVITY FOR 4G LONG TERM EVOLUTION (LTE) EVOLVED NODE B (eNB)

RELATED APPLICATIONS

The present application is a National Phase of International Application No. PCT/US2022/036634 filed Jul. 11, 2022.

TECHNICAL FIELD

This description relates to automatic ENDC (Evolved Universal Mobile Telecommunications System (UMTS) Terrestrial Radio Access Network (E-UTRAN) New Radio (NR)—Dual Connectivity (DC)) enabling for 4G Long Term Evolution (LTE) evolved Node B (eNB), and method of using the same.

BACKGROUND

Some networks include mixed co-located and non-co-located 4G Long Term Evolution (LTE) and 5G New Radio (NR) sites. A challenge is to identify non-co-located sites that have overlapping 5G coverage area from a co-located site. For a subscriber to use non-standalone (NSA) 5G services, ENDC is enabled in a 4G LTE site. ENDC stands for ENDC (Evolved Universal Mobile Telecommunications System (UMTS) Terrestrial Radio Access Network (E-UTRAN) New Radio (NR)—Dual Connectivity (DC)). ENDC is an NSA 5G architecture that allows smartphones to access the 5G node and the 4G LTE node at the same time.

Overlapping coverage is identified using a drive test or a coverage measurement test that is performed across the network. A drive test measures and assesses the coverage, capacity, and Quality of Service (QoS) of a mobile radio network. A drive test is performed using a mobile vehicle that is outfitted with specialized electronic devices that interface to mobile handsets. The electronic equipment includes mobile radio network air interface measurement equipment that detects and records a wide variety of the physical and virtual parameters of mobile cellular service in a given geographical area.

SUMMARY

In at least embodiment, a method for automatically triggering Evolved Universal Mobile Telecommunications System (UMTS) Terrestrial Radio Access Network (E-UTRAN) New Radio (NR)—Dual Connectivity (DC) (ENDC) enabling for a 4G Long Term Evolution (LTE) evolved Node B (eNB), includes receiving measurement reports at the 4G LTE eNB, based on the measurement reports, determining by the 4G LTE eNB, a number of Automatic ENDC Enable (AEE) criterion being met during a predetermined time period is greater than a threshold; and in response to the number of AEE criterion met during the predetermined time period being greater than the threshold, enabling ENDC for the 4G LTE eNB.

In at least one embodiment, a 4G LTE evolved Node B (eNB), includes a memory storing computer-readable instructions, and a processor connected to the memory, wherein the processor is configured to execute the computer-readable instructions to receive measurement reports at a non-collocated 4G LTE eNB, based on the measurement reports, determine a number of Automatic ENDC Enable (AEE) criterion being met during a predetermined time period is greater than a threshold, and in response to the number of AEE criterion met during the predetermined time period being greater than the threshold, enable Evolved Universal Mobile Telecommunications System (UMTS) Terrestrial Radio Access Network (E-UTRAN) New Radio (NR)—Dual Connectivity (DC) (ENDC) for the 4G LTE eNB.

In at least one embodiment, a non-transitory computer-readable media having computer-readable instructions stored thereon, which when executed by a processor causes the processor to receive measurement reports at a 4G Long Term Evolution (LTE) evolved Node B (eNB), based on the measurement reports, determine, by the 4G LTE eNB, a number of Automatic ENDC Enable (AEE) criterion being met during a predetermined time period is greater than a threshold, and in response to the number of AEE criterion met during the predetermined time period being greater than the threshold, enable Evolved Universal Mobile Telecommunications System (UMTS) Terrestrial Radio Access Network (E-UTRAN) New Radio (NR)—Dual Connectivity (DC) (ENDC) for the 4G LTE eNB.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 5 is a view of a table of ENDC related parameters according to at least one embodiment.

DETAILED DESCRIPTION

Figure 1:
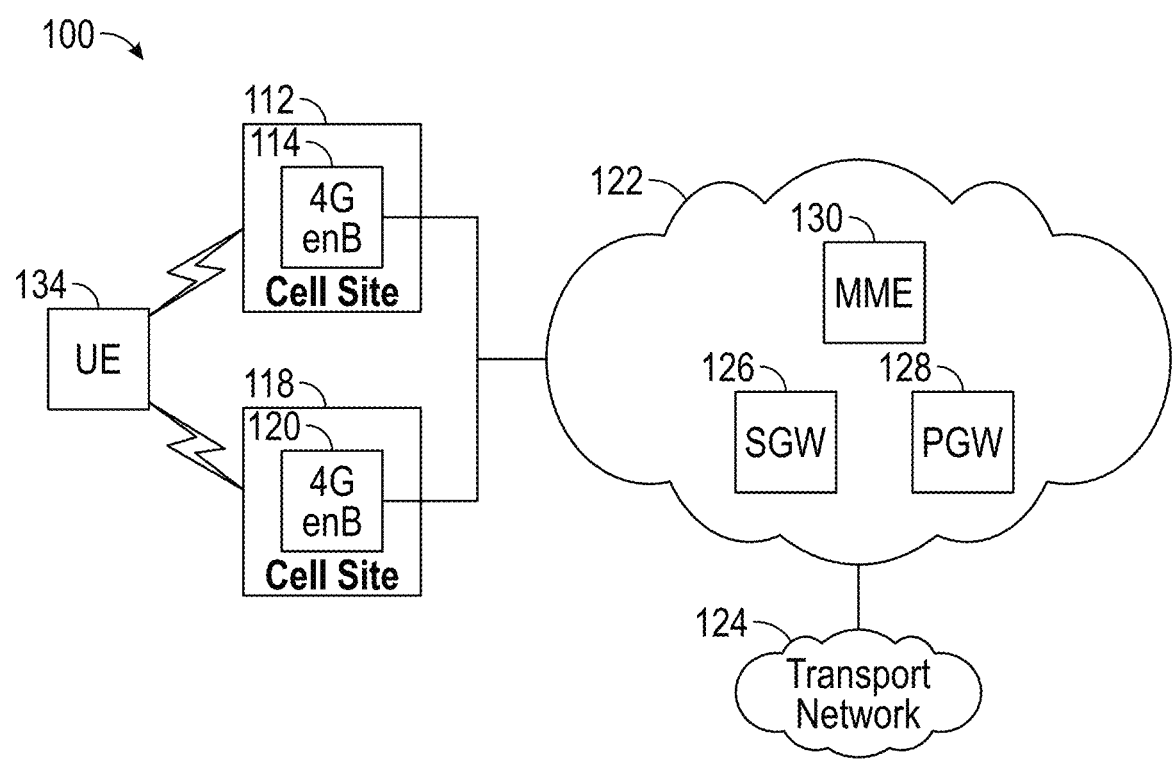
FIG. 1 is a simplified block diagram of a wireless communication system where a handover is performed according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, or substantially any data-stream or signaling-stream from UE.

Enabling Evolved Universal Mobile Telecommunications System (UMTS) Terrestrial Radio Access Network (E-UTRAN) New Radio (NR)—Dual Connectivity (DC) (ENDC) allows User Equipment (UE) to access a 5G node and a 4G Long Term Evolution (LTE) node at the same time. In response to enabling ENDC, a 5G icon is displayed on the UE. However, blindly enabling ENDC causes a UE to show a false 5G icon even if there is no 5G coverage for the UE. Displaying the false 5G icon when there is no 5G coverage causes confusion to the user. Such confusion leads to customer complaints because the user will see the false 5G icon but receives 4G throughput rather than 5G throughput.

Identifying overlapping coverage is used to determine coverage measurements. However, performing a drive test or a coverage measurement test across the network is time consuming and expensive. Furthermore, the coverage for 5G and the coverage for 4G shrink or expand over time due to modifications/enhancements/optimization made in the network. Thus, the coverage overlap changes over time. Accordingly, repetitive measurements are taken over a longer period of time, which leads to even more cost and time.

Embodiments described herein providing an automatic and simpler method that provides one or more advantages. For example, automatic enabling ENDC using previously collected measurement reports, such as prior measurements used for performing handover, reduces the cost of having to conduct drive tests, provides easy implementation of ENDC parameters, and reduces customer complaints as compared to blindly enabling ENDC.

FIG. 1 is a simplified block diagram of a wireless communication system 100 where a handover is performed according to at least one embodiment.

In FIG. 1 a first cell site 112 includes a 4G evolved Node B (eNB) 114 and a second cell site 118 includes a 4G eNB 120. Cell sites 112, 118 are capable of supporting one or more other Radio Access Technologies (RATs), e.g., Bluetooth, Wi-Fi, GSM (Global System for Mobile Communications), UMTS (Universal Mobile Telecommunications System), 4G LTE (Long Term Evolution), and 5G NR (New Radio). But the focus of FIG. 1 will be on 4G LTE. Cell sites 112, 118 are at a respective location within a region, and cell sites 112, 118 are neighbors such that UE 134 served by eNB 114 of cell site 112 moves to cell site 118 and is then served by eNB 120. The eNBs 114, 120 are coupled with a core network 122. Core network 122 provides connectivity with at least one transport network 124, such as the Internet.

The core network 122 includes a serving gateway (SGW) 126, a packet data network gateway (PGW) 128, and a mobility management entity (MME) 130. In at least one embodiment, eNBs 114, 120 include an interface with the SGW 126 and an interface with the MME 130, the MME 130 has an interface with the SGW 126, the SGW 126 has an interface with PGW 128, and the PGW 128 provides connectivity with the transport network.

In FIG. 1, UE 134 is currently being served by 4G eNB 114 of cell site 112 and UE 134 is moving from cell site 112 to cell site 118. UE 134 monitors measurement events with respect to 4G coverage, by comparing target 4G coverage strength from 4G eNB 120 to source 4G coverage strength from 4G eNB 114.

In response to UE 134 detecting that the target 4G coverage strength from 4G eNB 120 is greater by a handover threshold value than the serving 4G coverage strength from 4G eNB 114, UE 134 generates and transmits a measurement report to serving 4G eNB 114. In response, 4G eNB 114 engages in inter-base-station signaling with 4G eNB 120 to coordinate handover of the UE 134, so that UE 134 transitions from 4G service provided by 4G eNB 114 of cell site 112 to 4G service provided by 4G eNB 120 of cell site 118. A measurement report includes measurement results associated with reception quality, such as RSRP (Reference Signal Received Power) and RSRQ (Reference Signal Received Quality) of serving cell 112 and a neighbor cell 118 that is formed near the serving cell 112.

In response to UE 134 moving in the opposite direction from cell site 118 to cell site 112, UE 134 detects that the target 4G coverage strength from 4G eNB 120 is greater by a handover threshold value than the coverage strength from 4G eNB 114, UE 134 generates and transmits a measurement report to 4G eNB 120. In response, 4G eNB 120 engages in inter-base-station signaling with 4G eNB 114 to coordinate handover of UE 134, so that UE 134 transitions from 4G service provided by 4G eNB 120 of cell site 118 to 4G service provided by 4G eNB 114 of cell site 112.

Variations on this process are possible as well. For instance, in at least one embodiment, UE 134 is initially provisioned to apply a first handover threshold and the handover threshold is increased or decreased. The increase of the first handover threshold defers handover of UE 134 from the serving 4G eNB 114 to the target 4G eNB 120. Alternatively, in at least one embodiment, the first handover threshold is decrease to more readily allow handover of UE 134 from the UE's serving 4G eNB 114 to target 4G eNB 120. The amount of adjustment made to the handover threshold is based on an analysis of the measurement of the coverage strength of the serving 4G eNB 114 and target 4G eNB 120.

Figure 2:
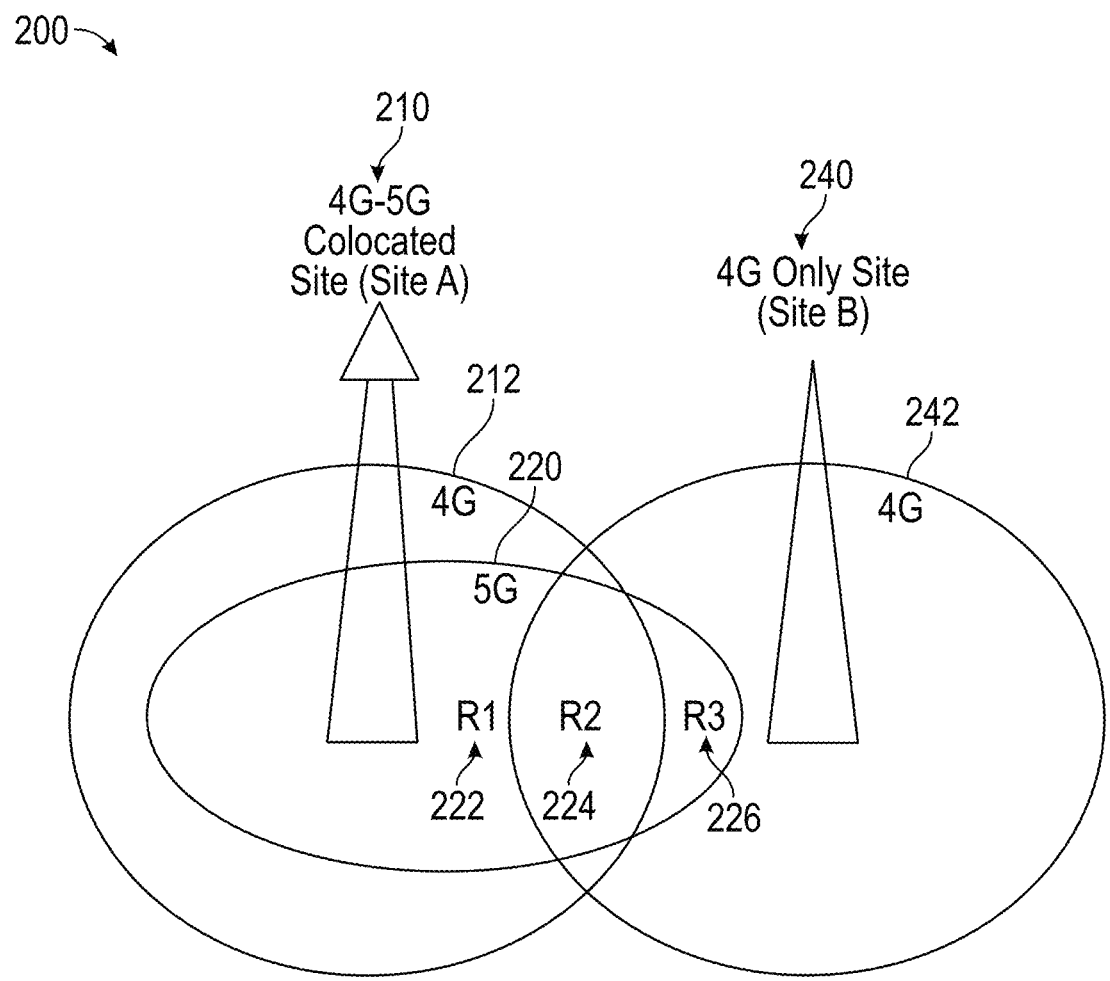
FIG. 2 is a block diagram of a wireless communication system where automatic enabling of Evolved Universal Mobile Telecommunications System (UMTS) Terrestrial Radio Access Network (E-UTRAN) New Radio (NR)—Dual Connectivity (DC) (ENDC) is performed according to at least one embodiment.

FIG. 2 is a block diagram of a wireless communication system 200 where automatic enabling of ENDC is performed according to at least one embodiment.

In FIG. 2, Site A 210 and Site B 240 are shown. Site A 210 and Site B 240 are neighbor sites. There are many neighbor sites to Site A 210. Site A 210 is a co-located LTE and NR site. Site A 210 includes NSA (non-standalone) 4G node and 5G node that are co-located. NSA (Non-Standalone) refers to the joint networking of 5G and 4G LTE, where 5G networks are deployed on the basis of existing 4G equipment. In Site A 210, the radio part is 5G NR and the core part is 4G Evolved Packet Core (EPC). Site B 240 shows a standalone (SA) 4G LTE site. The SA 4G LTE site is only 4G LTE and there 5G NR is not present in the same location.

The 4G coverage area 212 and the 5G coverage area 220 for NSA 4G node and 5G node is shown for Site A 210. The coverage area 242 for SA 4G node is shown for Site B 240. The coverage area 220 for the 5G node extends into the coverage area 242 of SA 4G node. In region R1 222 of the coverage area 220 for the 5G node is outside the coverage area 242 for SA 4G node. Region R2 224 in the coverage area 220 for the 5G node is within the coverage area 212 of the NSA 4G node and the coverage area 242 for SA 4G node. Region R3 226 in the coverage area 220 for the 5G node is outside the coverage area 212 of the NSA 4G node.

In a network with mixed co-located and non-co-located LTE and 5G NR sites, a challenge is to identify non-co-located sites, such as Site B 240, which has overlapping 5G coverage area 220 from a co-located site, such as Site A 210. The overlap is represented by R2 224 and R3 226. To solve this issue ENDC is enabled in non-co-located LTE site, i.e., Site B 240.

ENDC stands for Evolved Universal Mobile Telecommunications System (UMTS) Terrestrial Radio Access Network (E-UTRAN) New Radio (NR)—Dual Connectivity (DC). ENDC is a non-standalone (NSA) 5G architecture that allows smartphones to access the 5G node and the 4G LTE node. ENDC enables introduction of 5G services and data rates in a predominantly 4G network, such as Site B 240. UEs supporting ENDC can connect simultaneously to an LTE Master Node eNB (MN-eNB) and a 5G-NR Secondary Node gNB.

In Region 3 226, for a UE to access the 5G node of Site A 210 represented by coverage area 220 and the SA 4G node of Site B 240 represented by coverage area 242, ENDC has to be enabled for the SA 4G LTE node of Site B 240.

Figure 3:
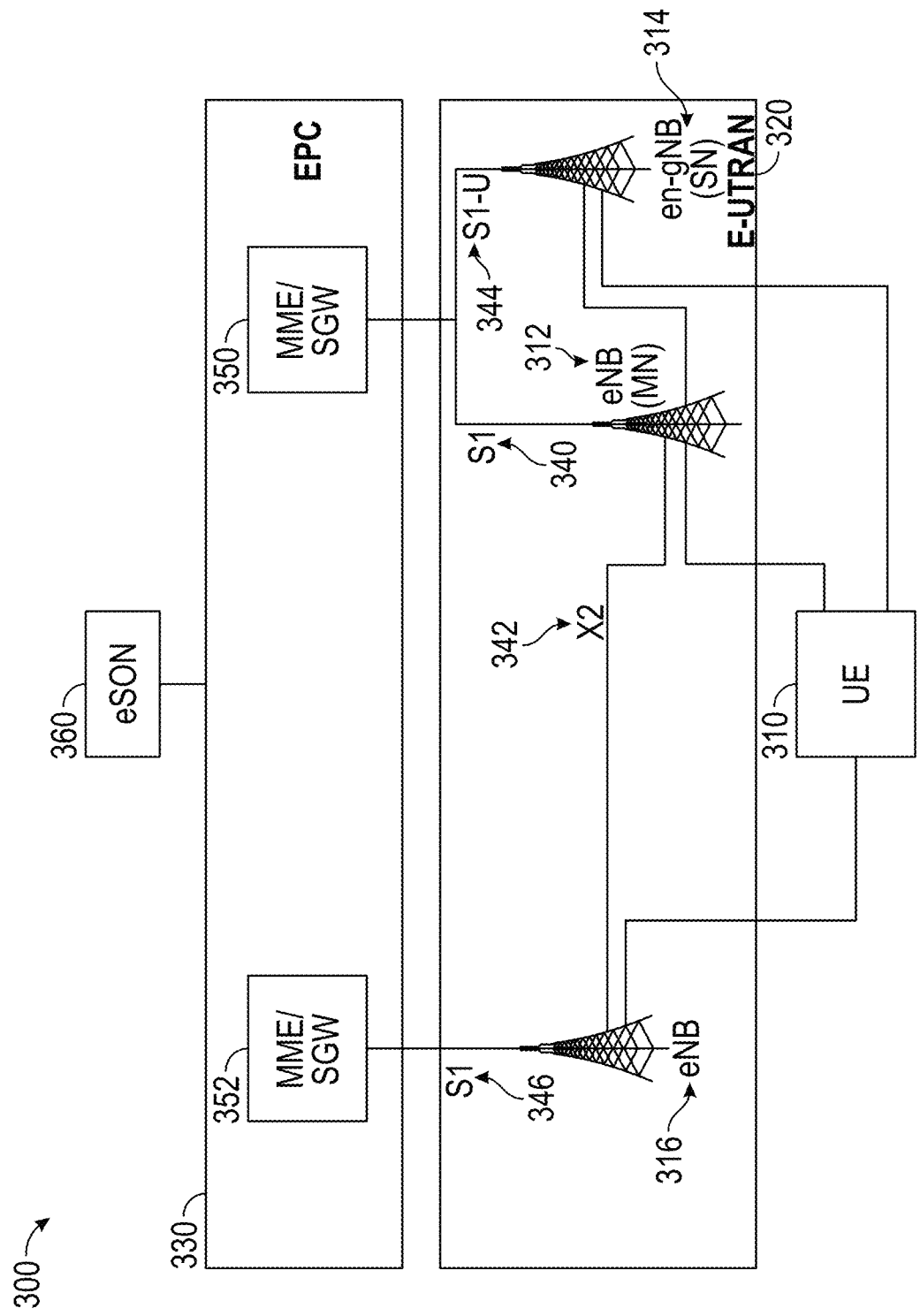
FIG. 3 is a block diagram of an ENDC enabled User Equipment (UE) according to at least one embodiment.

FIG. 3 is a block diagram of an ENDC enabled UE 300 according to at least one embodiment.

In FIG. 3, a UE 310 is connected to a first eNB 312 in E-UTRAN 320 that acts as the MN and to an en-gNB 314 that acts as a Secondary Node (SN). An en-gNB 314 is different from a gNB in that en-gNB implements part of the 5G base station functionality that is used to perform SN functions for ENDC. The eNB 312 is connected to the EPC 330 via the S1 interface 340 and to the en-gNB 314 via the X2 interface 342. The eNB 316 is connected to the EPC 330 via the S1 interface 346. The en-gNB 314 is also connected to the EPC 320 via the S1-U interface 344. The en-gNB 314 sends user-plane packets to the EPC 320 either directly via S1-U interface 344 or via the eNB 312. EPC 320 includes at least serving gateway MME/SGW 350, 352.

An ENDC enabled UE 310 first registers for service with the 4G EPC 330. The UE 310 also starts reporting measurements on 5G frequencies. If the signal quality for the UE 310 will support a 5G service, the LTE eNB 312 communicates with the 5G en-gNB 314 to assign resources for a 5G bearer. The 5G-NR resource assignment is then signaled to the UE 310.

Automatically enabling ENDC for a SA 4G LTE node associated with eNB 316 involves determining whether the measurement report satisfies an Automatic ENDC Enable (AEE) criterion and increasing a counter in response to the measurement report satisfies the AEE criterion. The count is increased over a predetermined time period in response to the AEE criterion being met. A determination is then made whether the count exceeds a predetermined threshold. In response to the count exceeding the predetermined threshold, ENDC parameters are enabled.

In at least one embodiment, determinations, counting, and decisions are made using a centralized server 360. For example, in at least one embodiment, the centralized server 360 is an enhanced Self-Organizing Network (eSON) server. The centralized server 360, e.g., eSON server, communicates with nodes 312, 314, 316, and based on the collected, measured statistics metrics, changes the configurations once these count thresholds are met. The configurations maintained in an Extensible Markup Language (XML) file are applied in response to the trigger, where the centralized server will initiate a http request towards a particular node to cause those configurations to take effect to enable ENDC for that node.

If there is a UE that does not have ENDC capability, then that UE will not be in an NR connected mode, but remains in an LTE connected mode via eNB 316. In a non-standalone 4G mode, e.g., eNB 312, there is not a direct connection by the UE 310 with the 5G node via en-gNB 314. The UE 310 establishes a 4G LTE connection with the MSA 4G node via eNB 312, and then eNB 312 coordinates establishment of a co-existing 5G connection with en-gNB 314. However, in response to standalone 5G networks infrastructure becoming available, then UE 310 will directly attach to a 5G node having a 5G core (not shown).

Figure 4:
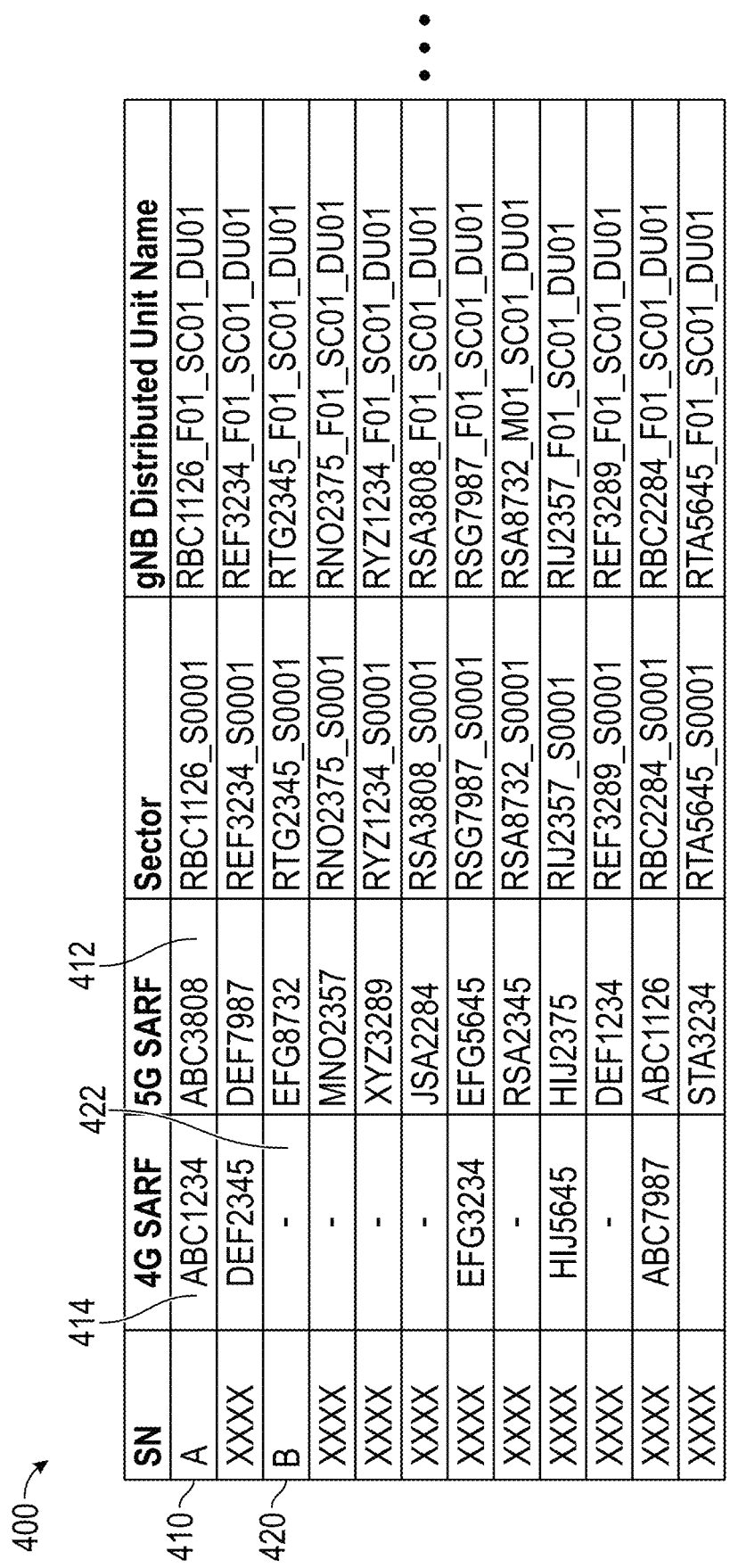
FIG. 4 is a view of a table in a database for network planning according to at least one embodiment.

FIG. 4 is a view of a table in a database 400 for network planning according to at least one embodiment.

In FIG. 4, there is a mapping from the master database or physical database that is accessible on a regular basis. The mapping data or master/physical database allows easy recognition of co-located sites and the setting of the ENDC parameters. For example, a master database identifies Site A 410 as having 5G Site Acquisition Request Form (SARF) 412 and 4G SARF 414 co-located. Thus, the database provides a mapping identifying Site A 410 as a 4G-5G co-located site. Site B 420 is a 4G standalone site so there is no mapping 422 of it with a 5G neighbor site. However, for non-co-located site, it is very complicated.

In response to ENDC being blindly enabled for any non-co-located site, the UE will show a false 5G icon even if there is no coverage of 5G. This leads to customer complaints because the user sees the false 5G icon but receives 4G throughput rather than 5G throughput. Despite the false 5G icon, 5G service standards will not be provided, e.g., eMBB (enhanced Mobile Broadband), URLLC (Ultra Reliable Low Latency Communications), etc. For example, the user experiences maximum throughput for LTE, which is low compared to that of 5G NR. This also leads to customer to complaints.

FIG. 5 is a view of a table 500 of ENDC related parameters according to at least one embodiment.

The parameters in the table of FIG. 5 are available in the network for cells. For example, In FIG. 5, two parameters that are shown to be enabled. More specifically, endcSupport 510 is shown as disabled 512, and endcPlmn 520 is shown as true 522. In FIG. 5, endcSupport 510 indicates whether ENDC is supported, and endcPlmn 520 indicates whether a 5G is co-located. In response to these endcSupport 510 and endcPlmn 520 being configured through the network as enabled and True, respectively, then ENDC is enabled to provide 5G coverage.

Referring again to FIG. 2, a UE will first be in idle mode. Then, the UE will begin making a call, e.g., a data call. The UE will attach to NSA 4G LTE node of Site A 210 based on 4G coverage 212 and the UE is in LTE connected mode. In response to NR being available based on 5G coverage 220 in Site A 210, and ENDC being supported, as indicated by a parameter representing whether ENDC is available or not, the UE starts in LTE connected mode, and transitions to NR connected mode.

For example, in response to a UE being in region R1 222, the UE has overlapping LTE connectivity and NR connectivity. Once the UE is in LTE connected mode, the UE easily moves to NR connected mode provided that the ENDC parameter is set. Then, the ENDC support parameter is configured for 4G, e.g., Site A 210, and the UE is able to use 4G and 5G.

In response to overlapping 5G coverage 220 existing as shown in FIG. 2 in regions R2 224 and R3 226, ENDC is enabled in Site B 240 so that a user is able to use the overlapping 5G coverage 220 in R2 224 and R3 226 from Site A 210 and the 4G coverage 242 in Site B 240. To prevent blindly enabling ENDC as described above that results in the display of the false 5G icon without 5G throughput, at least one embodiment relies on identification of the overlapping coverage and automatically enabling ENDC for the SA 4G LTE node of Site B 240.

A drive test or a coverage measurement test is used to identify overlapping coverage across the network, but is time consuming and expensive. Furthermore, the coverage 220 for 5G and the coverage for 4G 212, 242 shrink or expand over time. Thus, the overlap in R2 224 and R3 226 changes from the position shown in FIG. 2 over time. In response to these changes, repetitive measurements are taken over a longer period of time, which leads to even more cost and time.

To provide automatic ENDC enabling for a SA 4G LTE node according to at least one embodiment, measurements form collected handover data is used. For example, in response to the UE being in region R1 222, the 5G coverage 220 is very good. The UE begins to move from R1 222 to R2 224, and then from R2 224 to R3 226. At this time, ENDC is not enabled in Site B 240, but as described above, ENDC is enabled in Site A 210. Thus, in R1 222 and R2 224, the signaling goes through NSA 4G node via 4G coverage area 212 in Site A 210 and the data goes through the co-located 5G node via 5G coverage area 220 in Site A 210.

However, in response to the UE reaching R3 226, the coverage 212 of NSA 4G LTE of Site A 210 is lost and a handover is made to SA 4G LTE node of Site B based on 4G coverage area 242. Because Site B 240 is not an anchor site, the UE will lose 5G and transition to a full 4G LTE coverage. In response to the UE returning to R2 224 or R3 226, the UE is not able to experience 5G coverage despite the overlap of 5G coverage 220 of Site A.

In response to the UE moving, there is a process that is performed by the UE in dedicated mode where the UE has a dedicated connection, e.g., a dedicated uplink or downlink physical channel. The process involves collecting measurements of neighboring sites to use to determine when and how to perform a handover.

Figure 6:
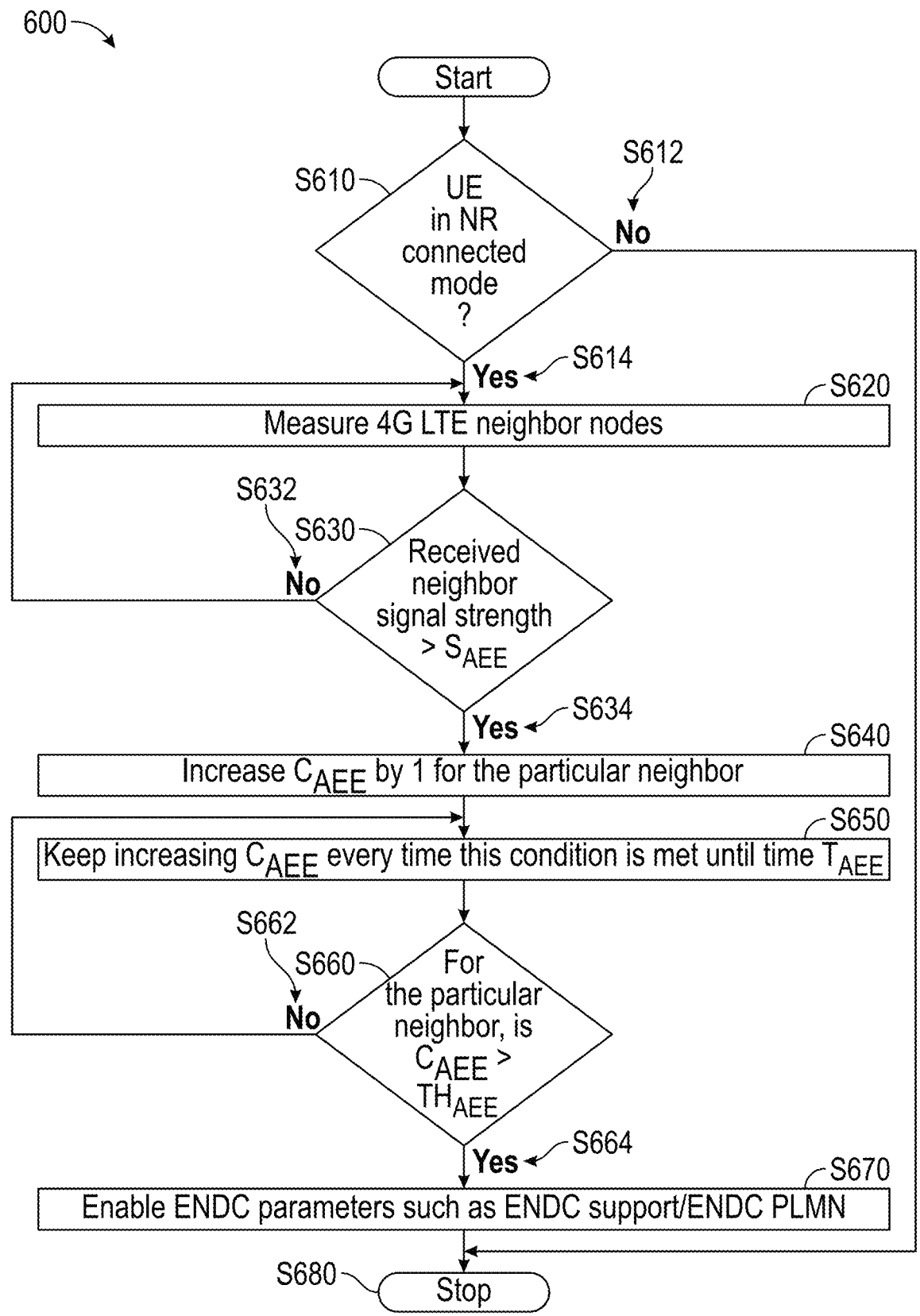
FIG. 6 is a flowchart of a method for automatically enabling ENDC for a standalone (SA) 4G Long Term Evolution (LTE) node according to at least one embodiment.

FIG. 6 is a flowchart 600 of a method for automatically enabling ENDC for a SA 4G LTE node according to at least one embodiment.

In at least one embodiment, the following parameters are used in the method for automatically enabling ENDC for a SA 4G LTE node. Trigger Quantity$_{AEE}$ is a measurement quantity RSRP or RSRQ. S$_{AEE}$ is a RSRP threshold for the AEE condition. R$_{AEE}$ is a RSRQ threshold for the AEE condition. TH$_{AEE}$ is a number of measurement reports threshold for a particular LTE eNB neighbor, during NR connected mode with RSRP>S$_{AEE}$ or RSRQ>S$_{AEE}$ based on Trigger Quantity$_{AEE}$. T$_{AEE}$ is the time period for counting measurement reports which satisfies the AEE condition.

In FIG. 6, a determination is made whether the UE is currently in 5G NR connected mode S610.

If no S612, the process terminates S680.

If yes, UE is measures neighbor LTE eNodeB (eNB) S620. The UE will send out measurement reports indicating a particular coverage for a particular site. Measurement reports are values reported from the UE that contain information about channel quality. Measurement reports assist the network in making handover and power control decisions. In response to the UE reaching R2 224 shown in FIG. 2, the measurement report shows a particular site as a preferable candidate for handover, e.g., Site B 240. In response to the UE moving to R3 226, Site A 210 has already handed the UE over to Site B 240.

Upon receiving the measurement report, a determination is made whether values in the measurement report satisfies the Automatic ENDC Enable (AEE) criterion (RSRP>S$_{AEE}$ or RSRQ>S$_{AEE}$) S630. In at least one embodiment, parameter S$_{AEE}$ is the Reference Signal Received Power (RSRP) threshold for Automatic ENDC Enable (AEE).

If no 632, the process continues to measure the 4G neighbor nodes S620.

In response to the measurement report satisfying the Automatic ENDC Enable (AEE) criterion (RSRP>S$_{AEE}$ or RSRQ>S$_{AEE}$) for a particular site S634, a counter, C$_{AEE}$, is increased by 1 for the particular site S640. C$_{AEE}$ is the counter that increases by 1 for a particular LTE neighbor, every time the measurement report from a UE satisfies the AEE criterion. For example, in at least one embodiment, the counter is increased for 4G neighbors individually in response to the RSRP for a neighbor site being greater than S$_{AEE}$.

The UE continues to measure the RSRP or RSRQ for neighboring sites for a predetermined period of time, T$_{AEE}$ S650.

After T$_{AEE}$, a determination is made, for the particular neighbor, whether C$_{AEE}$ is greater than a number of measurement reports threshold for the particular LTE eNB neighbor, TH$_{AEE}$ S660.

If not S662, the UE continues to measure the RSRP or RSRQ for neighboring sites for the predetermined time period, T$_{AEE}$ S650.

If C$_{AEE}$ is determined to be greater than TH$_{AEE}$ S664, ENDC is enabled for neighboring sites that satisfies this criterion S670. This data is stored in a database so that mappings are shown that are used to indicate there is a definite co-location and definite coverage overlap, and that, based on this criterion, ENDC is to be enabled.

The process then terminates S680.

At least one embodiment of the method automatically enables ENDC for a SA 4G LTE node based on prior measurements collected during handover. Automatically enabling ENDC provides at least the advantages of reducing the cost of having to conduct drive tests, providing easy implementation of ENDC parameters, and reducing customer complaints due to the display of the false 5G icon in response to ENDC being blindly enabled.

Information that is included in the system information includes an upper layer indication. In response to the upper layer indication set to True, the network supports ENDC capability. The upper layer indication indicates to the upper layers of the protocol stack that there is 5G NR cell coverage 220, e.g., overlap coverage 220 of 5G node of Site A 210 within the coverage 242 of 4G LTE node of Site B 240 in R3 226 as shown in FIG. 2. The fields in the upper layer indication tells the UE whether ENDC is enabled or not based on the parameter settings described above.

After these measurements and decisions described in FIG. 6, ENDC is enabled on SA 4G LTE node of Site B 240 through the parameters so that the UE can access coverage 220 of neighbor 5G node of Site A 210.

X2 definitions are also maintained to indicate how a first site, 5G node of Site A 210, is connected to a second site, 4G node of Site B 240. X2 definitions are maintained by 4G Site A 240 and 5G site A 210. For this enhancement to work, X2 needs to be pre-defined between 5G Site A 210 and 4G Site B 240. This involves identifying IP addresses that are defined for the execution of the handover.

Then the UE gets the coverage when the UE reads a Synchronization Signal/PBCH block (SSB). Through the SSB, the UE identifies neighbor 5G node of Site A 210, and then sends the SA 4G node of Site B 240 the addition requests. The UE is then connected to the SA 4G node of Site B 240.

Referring to FIG. 2 again, in response to ENDC being enabled on the SA 4G node of Site B 240, information of the coverage 220 of the 5G node of Site A 210 that is overlapping with Site B 240 is available. In response to ENDC being enable, 5G frequencies are measured. The SSB that is read has the Physical Cell ID (PCI), which is the site identifier of the 5G node of Site A 210. The UE informs SA 4G node of Site B 240, which has ENDC enabled, of the PCI, and then SA 4G node of Site B 240 starts communicating with the 5G node of Site A 210 through the X2 interface.

In at least one embodiment, the particular overlap is used to determine whether there is a significant overlap. Based on that, the UE requests the SA 4G node of Site B 240 to send out information to the UE to begin measuring signals of the 5G node of Site A 210 because of the overlap in R2 224 and R3 226.

The existing signal measurement process is utilized to enable ENDC. For example, the UE measures the signal strength via RSRP, or measures the quality via Reference Signal Received Quality (RSRQ). Another parameter that is used in at least one embodiment is Trigger Quantity$_{AEE}$, which is a measure of RSRP or RSRQ quantity. Quality is actually a measure of the power over the noise floor interference, which is a function of signal to noise ratio.

The measurement reports are basically signaling messages in eNB of Site B 240, and the eNB knows its signaling path and the directly connected data paths. So, even in response to these signaling being intended for neighbor 5G node of Site A 210 having overlapping coverage in R2 224 and R3 226 with the SA 4G LTE node of Site B 240, the signaling messages will go to the SA 4G LTE node of Site B 240, and in response to the SA 4G LTE node of Site B 240 being ENDC enabled, the SA 4G LTE Site B 240 communicates with NSA 5G Site A 210 to provision for the UE to directly communicate with 5G NSA Site A 210 (only data, signaling over SA 4G Site B 240).

In response to a ENDC capable UE that is passing signaling and data through NSA 5G node of Site A 210 that the UE is currently connected to, at the same time the UE collects measurements and produces measurement reports that include neighbor 4G LTE nodes, such as Site B 240, which are of value.

For SA 4G LTE node of Site B 240, which do not provide carriers for 5G, two nodes communicate to determine neighbor relations using the measurement reports. The neighbor relations already exist in the measurement reports. This is a precondition that 4G-4G are already neighbors for embodiments described herein.

Now, 5G UE reports such measurement reports and the process according to at least one embodiment considers the measurement reports for those particular users, but not for the other users that are already connected in the network. If a UE is currently connected to a SA 5G network, the process will not work. If a UE is currently connected to an SA 5G network and the UE also provides 4G measurements in its measurement report, 4G standalone site, e.g., Site B 240, has to have ENDC connectivity with a standalone 5G site, e.g., Site A 210. The UE has to be a standalone 4G-NSA 5G combination.

In FIG. 6, the evaluation criteria is based on whether the signal strength or the signal quality is better than some threshold. Comparing prior measurements, such as signal strength or signal quality, that were collected during handover to a threshold prevents blindly enabling ENDC as described above, and provides for automatically enabling ENDC based on such prior measurements. Automatically enabling ENDC provides at least the advantages of reducing the cost of having to conduct drive tests, providing easy implementation of ENDC parameters, and reducing customer complaints due to the display of the false 5G icon in response to ENDC being blindly enabled. As the process is configurable, it is flexible in those aspects and it is up to the how the user wants to implement the process.

In response to the measurement report, the system decides whether it wants to base its determination on RSRP, RSRQ, or both. This is defined through a predetermined trigger quantity. The trigger quantity is not part of measurement reports. The trigger quantity is a parameter that indicates whether the RSRP, the RSRQ, or both are to be used to make handover decisions. Trigger Quantity$_{AEE}$ is a predetermined value that is used in determining whether to enable automatic ENDC.

The eNB uses the trigger quantity value handover decisions. Embodiments described herein for automatic ENDC enabling rely on the Trigger Quantity$_{AEE}$. For handover, the trigger quantities are based on RSRP, but for at least one embodiment described herein, Trigger Quantity$_{AEE}$ is used. The trigger quantity value used for handover decisions is independent from the Trigger Quantity$_{AEE}$ that is used for automatic ENDC enabling. The administrator or designer determines what is used as Trigger Quantity$_{AEE}$. In response to the Trigger Quantity$_{AEE}$ being met, then that particular 4G LTE neighbor gets a one count or plus one. In response to the count being greater than a threshold, TH$_{AEE}$, then ENDC will be enabled. If not, then the counter will be reset and the process will start from zero.

The time period is provided because the counter can be increased over one day or one week or one month. In response to the counter matching the threshold over a period of one month, then there is not enough credibility for this site to have ENDC enabled. By setting a timeline, a rate is selected so that there is a good chance that there is a good number of UE having this coverage overlap over a period of time, or per unit time. Thus, rather than blindly enabling ENDC, the evaluation of the signal strength or signal quality versus a threshold over a period of time is used.

The measurement report represent historical data, but the time limit prevents the use of stale or old data being used, which leads to inaccurate information. Within a given time period, the ENDC is enabled for a particular 4G node, and at a later time period the data indicates disabling of ENDC. In at least one embodiment, another parameter, a disabling a time threshold or increasing the time threshold, is used to prevent switching between enabling and disabling ENDC too frequently.

The number of measurement reports are increased until a number of measurement reports are determined to generate acceptable results. A measurement report qualifies for purposes of the count in response to the RSRQ or the RSRP being greater than a certain level based on relative thresholds. A threshold is used directly in the evaluation of the measurement reports for enabling ENDC. The measurement reports evaluated for enabling ENDC is the same measurement report for determining handoffs. However, the RSRP level (the signal strength level) for ENDC enablement decisions is independent from those used for handovers.

At the border of R2 224 and R3 226, as shown in FIG. 2, a handover has already occurred. Thus, the measurements have been obtained before performing the handover. In at least one embodiment, the ENDC enablement threshold is less than that of handover criteria. Otherwise, once a determination is made to execute the handover, there is no point of measuring the levels. For example, there is an actual handover threshold, and the ENDC enablement threshold is greater or less than the handover threshold. The actual number is configurable because radio coverage changes. The embodiments described herein reduces the amount of handson taking of measurements and decision making by automating the ENDC enablement decision.

Figure 7:
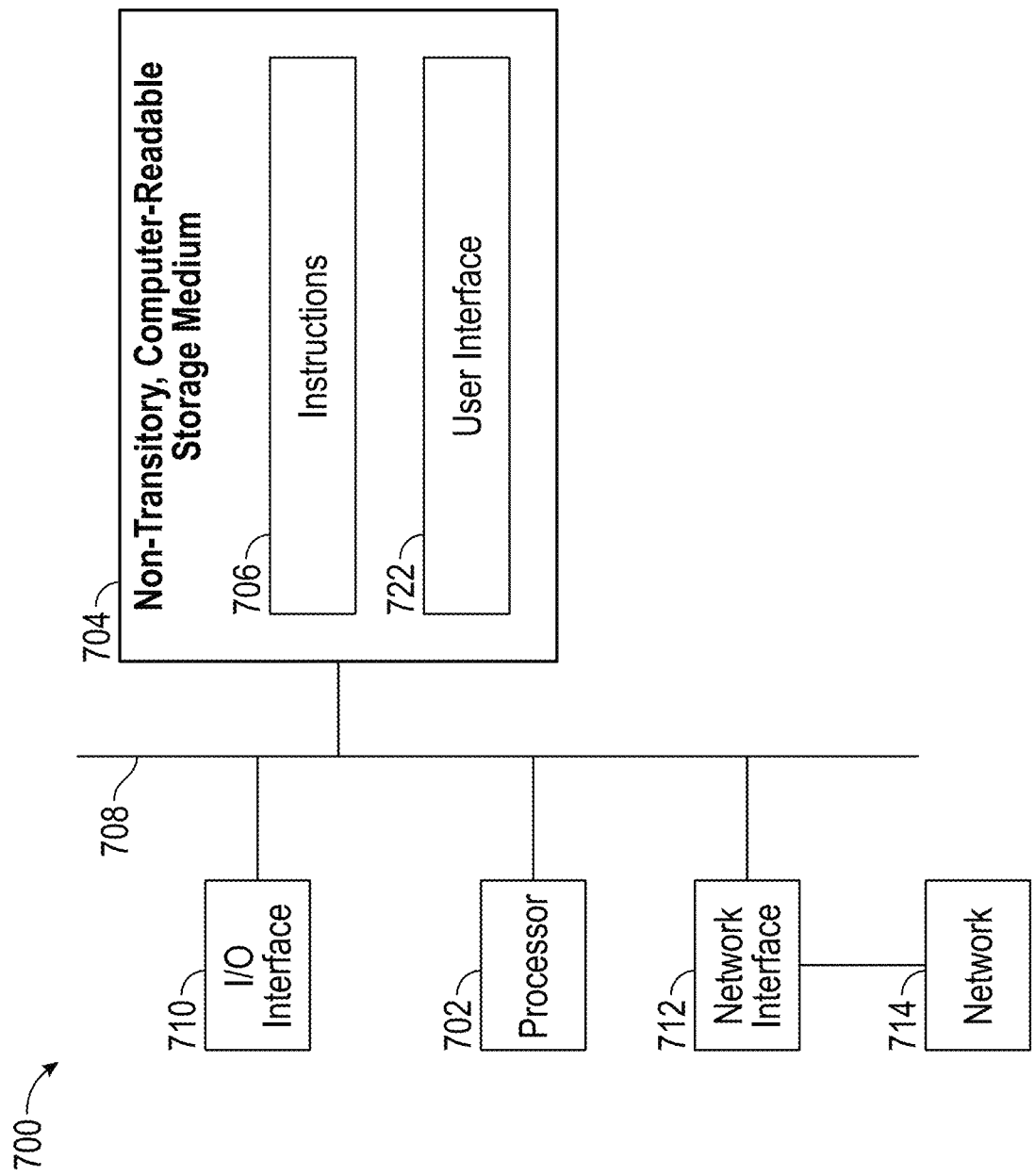
FIG. 7 is a high-level functional block diagram of a processor-based system according to at least one embodiment.

FIG. 7 is a high-level functional block diagram of a processor-based system 700 according to at least one embodiment.

In at least one embodiment, processing circuitry 700 provides automatic ENDC enabling for a SA 4G LTE node. Processing circuitry 700 implements automatic ENDC enabling for a SA 4G LTE node using processor 702. Processing circuitry 500 also includes a non-transitory, computer-readable storage medium 704 that is used to implement automatic ENDC enabling for a SA 4G LTE node. Storage medium 704, amongst other things, is encoded with, i.e., stores, instructions 706, i.e., computer program code that are executed by processor 702 causes processor 702 to perform operations for automatically enabling ENDC for a SA 4G LTE node. Execution of instructions 706 by processor 702 represents (at least in part) a network visualization application which implements at least a portion of the methods described herein in accordance with one or more embodiments (hereinafter, the noted processes and/or methods).

Processor 702 is electrically coupled to computer-readable storage medium 704 via a bus 708. Processor 702 is electrically coupled to an Input/output (I/O) interface 710 by bus 708. A network interface 712 is also electrically connected to processor 702 via bus 708. Network interface 712 is connected to a network 714, so that processor 702 and computer-readable storage medium 704 connect to external elements via network 714. Processor 702 is configured to execute instructions 706 encoded in computer-readable storage medium 704 to cause processing circuitry 700 to be usable for performing at least a portion of the processes and/or methods. In one or more embodiments, processor 702 is a Central Processing Unit (CPU), a multi-processor, a distributed processing system, an Application Specific Integrated Circuit (ASIC), and/or a suitable processing unit.

Processing circuitry 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

Processing circuitry 700 also includes network interface 712 coupled to processor 702. Network interface 712 allows processing circuitry 700 to communicate with network 714, to which one or more other computer systems are connected. Network interface 712 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 700 is configured to receive information through I/O interface 710. The information received through I/O interface 710 includes one or more of instructions, data, design rules, libraries of cells, and/or other parameters for processing by processor 702. The information is transferred to processor 702 via bus 708. Processing circuitry 700 is configured to receive information related to a User Interface (UI) through I/O interface 710. The information is stored in computer-readable medium 704 as UI 722.

In one or more embodiments, one or more non-transitory computer-readable storage media 704 having stored thereon instructions (in compressed or uncompressed form) that may be used to program a computer, processor, or other electronic device) to perform processes or methods described herein. The one or more non-transitory computer-readable storage media 704 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 704 includes a Compact Disk-Read Only Memory (CD-ROM), a Compact Disk-Read/Write (CD-R/W), and/or a Digital Video Disc (DVD).

In one or more embodiments, storage medium 704 stores computer program code 706 configured to cause processing circuitry 700 to perform at least a portion of the processes and/or methods for automatically enabling ENDC for a SA 4G LTE node based on prior measurements collected during handover. In one or more embodiments, storage medium 704 also stores information, such as algorithm which facilitates performing at least a portion of the processes and/or methods for automatically enabling ENDC for a SA 4G LTE node. Accordingly, in at least one embodiment, the processor circuitry 700 performs a method for automatically enabling ENDC for a SA 4G LTE node based on prior measurements collected during handover. The process of automatically enabling ENDC based on measurement reports collected during a prior handover, determining whether values in the measurement report satisfy an AEE Criterion, maintaining a count of the AEE criterion being met for every LTE eNB neighbor individually for a predetermined time period, and enabling ENDC after the predetermined time period in response to the count being greater than a predetermined threshold provides at least the advantages of reducing the cost of having to conduct drive tests, providing easy implementation of ENDC parameters, and reducing customer complaints due to the display of the false 5G icon in response to ENDC being blindly enabled.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for automatically triggering Evolved Universal Mobile Telecommunications System (UMTS) Terrestrial Radio Access Network (E-UTRAN) New Radio (NR)—Dual Connectivity (DC) (ENDC) enabling for a 4G Long Term Evolution (LTE) evolved Node B (eNB), comprising:
   receiving measurement reports at the 4G LTE eNB;
   based on the measurement reports, determining by the 4G LTE eNB, a number of Automatic ENDC Enable (AEE) criterion being met during a predetermined time period is greater than a threshold; and
   in response to the number of AEE criterion met during the predetermined time period being greater than the threshold, enabling ENDC for the 4G LTE eNB.

2. The method of claim 1, wherein the receiving measurement reports further includes receiving measurement reports generated by user equipment (UE) during a prior handover.

3. The method of claim 1, wherein the measurement report includes results associated with reference signal measurements.

4. The method of claim 3, wherein the reference signal measurements includes one or more of a measurement of RSRP (Reference Signal Received Power) and RSRQ (Reference Signal Received Quality).

5. The method of claim 1, wherein the determining the number of AEE criterion being met during the predetermined time period is greater than the threshold further includes:
   determining one or more of RSRP (Reference Signal Received Power) measurements being greater than an RSRP threshold for the AEE criterion and RSRQ (Reference Signal Received Quality) measurements being greater than an RSRQ threshold for the AEE criterion;
   based on determining one or more of RSRP measurements being greater than the RSRP threshold for the AEE criterion and RSRQ measurements being greater than the RSRQ threshold for the AEE criterion, increasing a counter by 1 for the 4G LTE eNB; and
   after a predetermined period of time, determining whether the counter is greater than a number of measurement reports threshold associated with one or more of RSRP measurements determined to be greater than the RSRP threshold for the AEE criterion and RSRQ measurements determined to be greater than the RSRQ threshold for the AEE criterion.

6. The method of claim 5, wherein the enabling ENDC for the non-collocated 4G LTE eNB is based on the counter being determined to be greater than the number of measurement reports threshold associated with one or more of RSRP measurements determined to be greater than the RSRP threshold for the AEE criterion and RSRQ measurements determined to be greater than the RSRQ threshold for the AEE criterion.

7. The method of claim 6, wherein in response to the counter being determined to be greater than the threshold, enabling ENDC for the 4G LTE eNB.

8. A 4G LTE evolved Node B (eNB), comprising:
   a memory storing computer-readable instructions; and
   a processor connected to the memory, wherein the processor is configured to execute the computer-readable instructions to:
      receive measurement reports at a non-collocated 4G LTE eNB;
      based on the measurement reports, determine a number of Automatic ENDC Enable (AEE) criterion being met during a predetermined time period is greater than a threshold; and
      in response to the number of AEE criterion met during the predetermined time period being greater than the threshold, enable Evolved Universal Mobile Telecommunications System (UMTS) Terrestrial Radio Access Network (E-UTRAN) New Radio (NR)-Dual Connectivity (DC) (ENDC) for the 4G LTE eNB.

9. The 4G LTE eNB of claim 8, wherein the processor is further configured for receiving the measurement reports by receiving measurement reports generated by user equipment (UE) configured in 5G NR connected mode during a prior handover.

10. The 4G LTE eNB of claim 8, wherein the measurement report includes results associated with reference signal measurements.

11. The 4G LTE eNB of claim 10, wherein the reference signal measurements includes one or more of a measurement of RSRP (Reference Signal Received Power) and RSRQ (Reference Signal Received Quality).

12. The 4G LTE eNB of claim 8, wherein the processor determines the number of AEE criterion being met during the predetermined time period is greater than a threshold by further:
   determining one or more of RSRP (Reference Signal Received Power) measurements being greater than an RSRP threshold for the AEE criterion and RSRQ (Reference Signal Received Quality) measurements being greater than an RSRQ threshold for the AEE criterion;
   based on determining one or more of RSRP measurements being greater than the RSRP threshold for the AEE criterion and RSRQ measurements being greater than the RSRQ threshold for the AEE criterion, increasing a counter by 1; and
   after the predetermined time period, determining whether the counter is greater than a number of measurement reports threshold associated with one or more of RSRP measurements determined to be greater than the RSRP threshold for the AEE criterion and RSRQ measurements determined to be greater than the RSRQ threshold for the AEE criterion.

13. The 4G LTE eNB of claim 12, wherein the processor enables ENDC based on the counter being determined to be greater than the number of measurement reports threshold associated with one or more of RSRP measurements determined to be greater than the RSRP threshold for the AEE criterion and RSRQ measurements determined to be greater than the RSRQ threshold for the AEE criterion.

14. The 4G LTE eNB of claim 13, wherein in response to the counter being determined to be greater than the threshold, the processor enables ENDC.

15. A non-transitory computer-readable media having computer-readable instructions stored thereon, which when executed by a processor causes the processor to perform operations comprising:
   receiving measurement reports at a 4G Long Term Evolution (LTE) evolved Node B (eNB);
   based on the measurement reports, determining, by the 4G LTE eNB, a number of Automatic ENDC Enable (AEE) criterion being met during a predetermined time period is greater than a threshold; and
   in response to the number of AEE criterion met during the predetermined time period being greater than the threshold, enabling Evolved Universal Mobile Telecommunications System (UMTS) Terrestrial Radio Access Network (E-UTRAN) New Radio (NR)-Dual Connectivity (DC) (ENDC) for the 4G LTE eNB.

16. The non-transitory computer-readable media of claim 15, wherein the receiving measurement reports further includes receiving measurement reports generated by user equipment (UE) configured in 5G NR connected mode during a prior handover.

17. The non-transitory computer-readable media of claim 15, wherein the measurement report includes results associated with reference signal measurements.

18. The non-transitory computer-readable media of claim 17, wherein the reference signal measurements includes one or more of a measurement of RSRP (Reference Signal Received Power) and RSRQ (Reference Signal Received Quality).

19. The non-transitory computer-readable media of claim 15, wherein the determining the number of AEE criterion being met during the predetermined time period is greater than a threshold further includes:
   determining one or more of RSRP (Reference Signal Received Power) measurements being greater than an RSRP threshold for the AEE criterion and RSRQ (Reference Signal Received Quality) measurements being greater than an RSRQ threshold for the AEE criterion;
   based on determining one or more of RSRP measurements being greater than the RSRP threshold for the AEE criterion and RSRQ measurements being greater than the RSRQ threshold for the AEE criterion, increasing a counter by 1 for the non-collocated 4G LTE eNB; and
   after a predetermined period of time, determining whether the counter is greater than a number of measurement reports threshold associated with one or more of RSRP measurements determined to be greater than the RSRP threshold for the AEE criterion and RSRQ measurements determined to be greater than the RSRQ threshold for the AEE criterion.

20. The non-transitory computer-readable media of claim 19, wherein the enabling ENDC for the non-collocated 4G LTE eNB is based on the counter being determined to be greater than the number of measurement reports threshold associated with one or more of RSRP measurements determined to be greater than the RSRP threshold for the AEE criterion and RSRQ measurements determined to be greater than the RSRQ threshold for the AEE criterion.

* * * * *